Sept. 27, 1960   C. A. CIBELIUS, JR   2,954,479
PHOTOELECTRIC CONDITION CONTROL SYSTEM
Filed Oct. 10, 1958

INVENTOR.
CHARLES A. CIBELIUS JR.
BY Carlson, Pitzner,
Hubbard & Wolfe
ATTORNEYS United States Patent Office 2,954,479
Patented Sept. 27, 1960

2,954,479

PHOTOELECTRIC CONDITION CONTROL SYSTEM

Charles A. Cibelius, Jr., Rockford, Ill., assignor to Barber-Colman Company, Rockford, Ill., a corporation of Illinois Filed Oct. 10, 1958, Ser. No. 766,439

8 Claims. (Cl. 250—231)

The present invention relates to condition control systems and more particularly to an automatic temperature control arrangement of the moving vane photoelectric type.

It is an object of the invention to provide an automatic control which is sensitive and precise and which enables a condition, for example temperature, to be controlled within narrow limits. It is another object of the present invention to provide a photoelectric control arrangement having novel provision for preserving the accuracy of control in the face of wide changes in the ambient temperature to which the device is subjected. It is still another object of the present invention to provide an automatic control device which is reliable even in the face of the roughest industrial use and which is simple, compact and easily portable.

It is another object of the present invention to provide a photoelectric control circuit which utilizes the characteristics of transistors in a novel fashion. It is a more specific object of the invention to provide a control system in which the input characteristics are coordinated in a novel way with the load characteristics of the photocell so as to produce a maximum change in the transistor control current for a given increment of light falling upon the photocell.

It is another object related to the foregoing to provide a low power, transistor control circuit which is, nevertheless, capable of controlling the operation of an industrial type relay for effecting a corrective change in the condition being controlled. It is still another object to provide a photoelectric control system having transistors for operating an output relay and which includes provision for producing snap action of the transistors between the conducting and non-conducting states upon small increments in the light falling upon said photocell. It is still another object to provide a condition control system having an electromagnetic relay with provision for causing the relay to snap cleanly between its picked up and dropped-out conditions to make the accuracy of control independent of variations in the pickup and drop-out voltage and to avoid chatter and wear at the contacts.

Finally it is an object of the invention to provide a photoelectric control arrangement which is inexpensive to construct, utilizing simple low cost elements, and which is capable of operating reliably over long periods of time with little or no maintenance.

Other objects and advantages of the invention will become apparent upon reading the attached detailed description and upon reference to the drawings in which.

Figure 1:
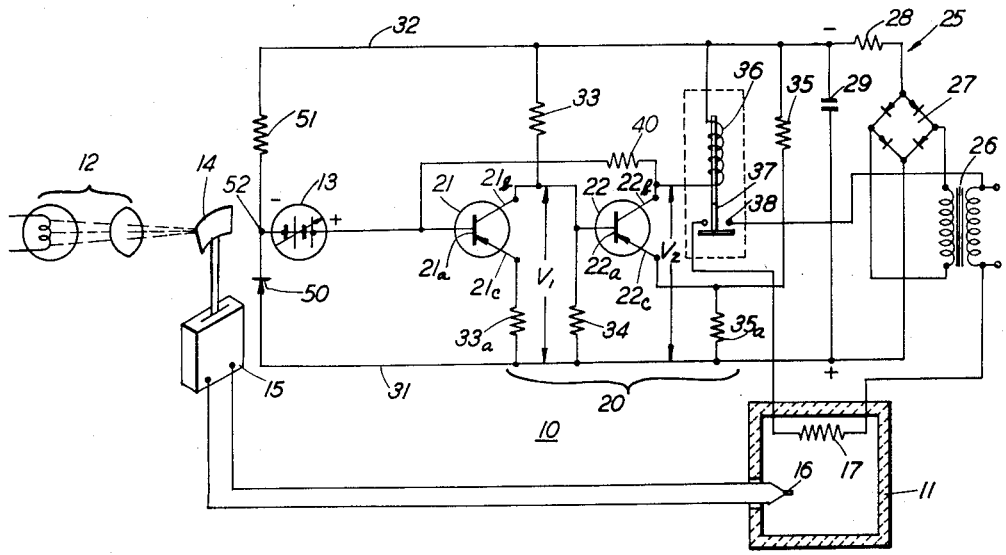
Figure 1 is a schematic diagram of a control system constructed in accordnace with the present invention.

Turning now to Fig. 1 there is shown a control system 10 constructed in accordance with my invention and which, in the present instance, is employed for controlling the temperature within an enclosure 11. The control system includes a light source 12 and a photocell 13. Interposed between the light source and photocell is a moving vane 14 for controlling the light which falls upon the photocell. Means are provided for causing the moving vane 14 to occupy a position depending upon the condition being measured. In the present instance this is brought about by a d'Arsonval movement 15 which is energized by a thermocouple 16 within the chamber 11, with the movement being polarized so that upon increasing temperature the vane 14 moves into the light-blocking position shown, thereby to darken the photocell. The circuit is so arranged, as will be discussed in some detail below, that cutting off of light from the photocell 13 has the effect of cutting off the heat supplied to the chamber 11, for example, by de-energizing a heating element 17 within the chamber. Conversely, movement of the vane 14 out of the light path incident to a drop in temperature within the chamber causes the heating element to be re-energized to restore the temperature to the desired control point.

In accordance with the invention the control circuit 10 includes a transistor amplifier 20 having its input fed directly by a photocell of the silicon p-n junction type capable of producing a photo-voltaic voltage at its output terminals in addition to undergoing a change in resistance as the light input is varied. A silicon cell of this type is more generally referred to as a "solar" cell intended primarily for the powering of current-consuming devices such as radios and the like when subjected to the action of sunlight. The amplifier 20 includes an input transistor 21 and an output transistor 22 both arranged in a common emitter circuit with the base, collector and emitter being designated by "a," "b," and "c."

For the purpose of energizing the transistors, a power supply 25 is provided which includes a transformer 26, a bridge rectifier 27 and a filter consisting of a transistor 28 and a capacitor 29. Thus a direct voltage is produced between a positive bus 31 and a negative bus 32.

Included in the circuit of the first transistor is a load resistor 33 and a bias resistor 33a supplying the emitter. In the circuit of the second transistor is an input resistor 34 and a biasing voltage divider 35, 35a, with the emitter being connected to the junction between the latter. As shown, the two transistors are directly coupled with the collector element of the first being connected to the base of the second. The collector voltages with respect to the positive bus are indicated at $V_1$ and $V_2$ respectively. Connected in the output circuit of the second transistor 22 is a relay having a coil 36, plunger 37 and contacts 38. The contacts 38 are connected in series with the heating element 17 previously referred to.

Figure 3:
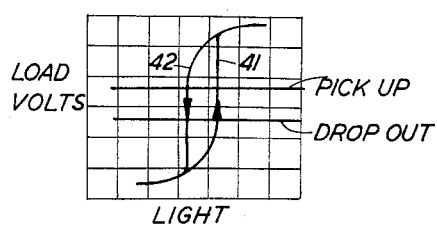
Fig. 3 is a plot of load voltage as a function of incident light upon the photocell.

In accordance with one of the aspects of the invention a feedback connection in the form of a feedback resistor 40 is connected between the output of the second transistor and the input of the first, i.e., between collector 22b and base 21a. The value of the resistor 40 is selected to produce snap action of the relay 36 upon small changes in the light admitted to the photocell 13 without, however, introducing any substantial hysteresis effect or "dead band" in the control system. Because of the fact that the two transistors are directly coupled, any decrease in the current in the first transistor is accompanied by an increase in the load current in the second transistor and vice versa. Since the second stage always acts in a direction opposite to the first, a positive feedback connection between them serves to accelerate any change in condition which may be initiated at the input of the first transistor. A typical operating sequence will be reviewed at a later point. For the present consider the condition in which negative signal voltage is applied to the base of the first transistor. This causes a flow of emitter-base current producing an amplified flow of emitter-collector current. Assuming that the second transistor is normally biased to conduct, the resulting increase in the voltage drop through the load resistor 33 causes a reduction in the voltage $V_1$, with the result that there is a decrease in the base current and hence a decrease in the collector current of the second transistor, producing an increase in the voltage $V_2$. A portion of this latter, negative-going voltage is applied as a feedback voltage to the base of the first transistor through the feedback resistor 40, thereby producing an accelerated increase in the base current of the first transistor so that the initiating change in voltage fed back in ever increasing amounts tend to be accelerated or "snowballed." The net effect is that the transistors change from one condition of conduction to the other with abrupt "snap action." Accordingly, the relay 36 is either supplied with current substantially above the pickup value or substantially below the drop-out value producing positive relay action with no chattering at the contacts 38. Using an appropriate value of feedback resistor 40, a characteristic such as shown in Fig. 3 is obtained. Here the load voltage fed to the relay is plotted in terms of the light applied to the photocell. Upon an increase in light the voltage remains at a low value until a certain critical amount of light falls upon the photocell, whereupon the transiston mentioned above takes place and the voltage abruptly rises along the curve 41, closing the relay so that additional heat is produced by the heating element 17. Upon a decrease in amount of light striking the photocell (resulting from an increase in temperature within the heated space), a point of light is reached which triggers the control circuit to produce an abrupt drop in the current supplied to the relay as indicated at 42 so that the relay drops out de-energizing the heating element 17.

In accordance with the present invention means are provided for compensating for the effect of the ambient temperature in the emitter-base circuit of the transistor 21 so that the control point remains constant over a wide range of ambient temperature. This is accomplished by providing a conducing element having a current-temperature characteristic similar to that of the emitter-base circuit of the transistor and by arranging such conducting element in parallel with a circuit which includes the emitter-base circuit and the photocell 13 connected in series therewith. Conveniently the conducting element may take the form of a diode 50 polarized as shown and consisting of the same material as the transistor. Thus I prefer to employ a 1N91 diode in conjunction with a 2N44 transistor in the input stage, both diode and transistor being of the germanium type. However, if desired, a germanium bar may be substituted for the diode 50 since the uni-directional conduction characteristics of the diode are not utilized in the present circuit. Both the left hand terminal of the photocell 13 and the upper terminal of the diode are coupled to the negative bus 32 via terminal 52 and bias resistor 51.

The operation of the diode in compensation for temperature changes may be understood by assuming that the photocell 13 is replaced by a fixed resistor, which condition corresponds to a condition of constant light value. Under such conditions the base of the transistor 21 will have a certain bias depending upon the relation of the resistances in the circuit. It will be assumed that resistances are so chosen that the base of the transistor 21 is negatively biased so that predetermined current flows through the emitter-base circuit of the transistor and through the biasing resistor 51. Predetermined current also flows through the diode 50 and resistor 51. Upon any change in temperature acting upon the transistor there will tend to be a change in the current which flows through the emitter-base circuit of the transistor. However, in carrying out the teachings of the invention, a corresponding and equal change will take place in the current flowing through the diode. Since the base-emitter current and the diode current are both carried by the resistor 51, the effect is to produce a small voltage change at the terminal 52 which correctively changes the bias current in the emitter-base circuit to compensate for the change in temperature.

In accordance with one of the aspects of the invention, the photocell 13 is so polarized that the output voltage which appears across its terminals when struck by incident light tends to oppose or buck the pre-existing negative bias. Thus, increasing the light applied to the photocell tends to reduce the current flowing in the emitter-base circuit of the transistor 21 while reducing the light falling upon the photocell has the opposite effect.

The significance of the above, and an understanding of the remaining features of the circuit, may be facilitated by considering a typical operating cycle. Let us assume that the chamber 11 is approaching proper temperature and that the vane 14 is approaching a light obstructing position. Under such conditions the second transistor 22 is conducting and the relay is closed, energizing the heating element 17. The photocell under "dark" conditions develops no output voltage and therefore may be considered as simply a resistance in the circuit. Under such conditions the voltage drop through the bias resistor 51 and the feedback 40 is sufficient to bias the base 21a so that emitter-base current flows, causing an amplified flow of current through the collector circuit 21b. This causes a voltage drop in the load resistor 33, reducing the voltage $V_1$ applied to the base of the transistor 22. In other words the voltage at the base 22a is made less negative causing a decrease in the current flowing through the base 22a and an amplified decrease in the current flowing through the collector 22b. This reduces the voltage in the relay coil 36 and increases the voltage $V_2$ at the output of the transistor 22. This negative-going voltage is applied as a positive feedback to the base 21a of the input transistor. The effect of the feedback voltage through the resistor 40 is to increase the base current which is immediately accompanied by an increase in the output or collector current of the transistor 21 and a further amplified decrease in the output current of the transistor 22 so that the transistor 21 becomes conductive to the point of saturation and the transistor 22 becomes non-conductive. This causes the relay to drop out thus de-energizing the heater 17.

As the temperature in the heated chamber 11 drops slightly due to dissipation of heat, the output of the thermocouple 16 will also drop, resulting in movement of the vane 14 in a direction to uncover the light source so that light falls upon the photocell 13. The photocell thus generates a voltage in the direction shown which is in a direction tending to oppose or buck the normally applied negative bias. The effect is to produce a positive-going voltage at the base resulting in a decrease of base current accompanied by an amplified decrease of collector current. A reduction in the load current flowing through the resistor 33, causes the voltage $V_1$ applied to the base of the second transistor to be negative-going, producing an increased flow of base current and an increase in the flow of current through the collector 22b. This increase has two effects. First of all it increases the current flowing through the relay 36. Secondly, it produces a positive-going voltage which is applied through the feedback resistor 40 to the base of the transistor 21. This causes the base current of the input transistor to decrease still further producing an amplified decrease in the collector current of the first transistor and amplified increase in the collector current of the second transistor to saturation, with the result that the relay current increases abruptly to a high value, a value well above that required for "pull-in." Consequently the relay snaps closed, closing the contacts 38 and re-energizing the heating element 17 to supply additional heat in the chamber. The additional heat causes movement of the vane 14 again into the path of light which reduces the output voltage of the voltage cell 13 causing the cycle to be repeated.

While it has been assumed in the above discussion that the vane 14 moves through relatively wide limits, to expose and cover the photocell, nevertheless it is found that using the present control circuit the sensitivity is extremely high so that corrective action takes place with movement of the vane through a limited range of only a small fraction of an inch and which may be so limited as to be measured in thousandths of an inch. Because of the snap action effect described above the transistors operate in only two conditions namely non-conducting and saturated. In both of these conditions the power dissipation is low. Consequently it is possible to employ a relatively heavy industrial type relay for direct control of heavy output current using inexpensive transistors of limited power rating. The second transistor may, for example, be of the common and inexpensive type 2N270.

Figure 2:
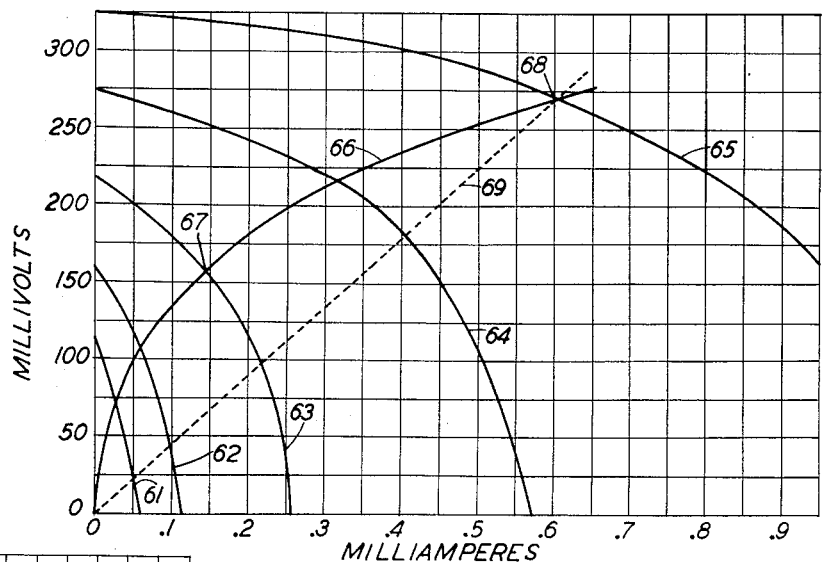
Fig. 2 is a plot showing the output characteristics of a silicon p-n photoelectric cell and the input characteristics of a transistor.

The novel coordination between the output characteristics of the silicon p-n photocell 13 and the input characteristics of the transistor 21 may be appreciated by referring to Fig. 2 which is a plot of voltage and current for the various light values. The family of curves corresponding to illuminations of 25, 50, 100 and 200 and 400 foot-candles of illumination are set forth at 61—65 respectively in this figure. The transistor input characteristic for a typical transistor, here type 2N44, is shown at 66. The transistor input characteristic crosses the 100 and 400 foot-candle curves at 67, 68. Thus it will be apparent that a change in illumination between 100 and 400 foot-candles is effective to produce a change in the transistor base current of 0.605 to 0.143 milliampere, a change of 0.462 milliampere. For the sake of comparison, suppose that the transistor input characteristic were linear instead of having the distinctive shape shown, i.e., suppose that such characteristic followed a straight line 69. Under such condition, for the same change in illumination, the change in base current would be 0.605 milliampere minus 0.219 milliampere or a change of 0.386 milliampere which is less than the change which occurs in the present device. It will therefore be seen that the combination of silicon p-n photocell and a germanium transistor is one which produces an unsually high change in control current for a given change in illumination. This helps to account for the sensitiveness and efficiency of the disclosed control circuit.

The entire device may be constructed with extreme compactness and is ideally suited to rough industrial use. All of the components are of inherently low cost and long life and the device is therefore less expensive to construct and maintain than devices conventionally employed for controlling of temperature.

While the control circuit has been discussed above specifically in connection with control of temperature, it will be apparent to one skilled in the art that the invention is not limited thereto and that the device is equally suited for controlling of other variables, requiring simply a change in the condition sensing element and provision of appropriate means for effecting a change in condition.

The term "photoelectric" employed in the claims is used in a generic sense and thus includes "photovoltaic" cells employed in the preferred embodiment of the invention.

I claim as my invention:

1. In an apparatus for controlling a variable condition the combination comprising a light source, a silicon p-n junction photoelectric cell optically alined with said source, means including a light vane interposed between said source and said photocell for covering and uncovering said photocell in response to changes in the condition, a transistor having a base, collector and emitter, said photocell being arranged in series with the emitter-base circuit for controlling the base current so that the transistor becomes conducting and non-conducting depending upon the presence or absence of the vane, and means coupled to said collector and responsive to the condition of conduction of the transistor for correctively changing the condition.

2. In an apparatus for controlling a variable condition the combination comprising a light source, a silicon p-n junction photoelectric cell optically alined with said source, means including a movable light vane interposed between said light source and said photocell for progressive changing of the light in accordance with a change in the condition, a transistor having an input circuit and an output circuit, a source of bias for normally biasing the input circuit of said transistor, said photocell being connected in the input circuit so that variations in light produce variations in bias, and positive feedback means between the output and the input circuits of the transistor so that the transistor is abruptly switched between fully conducting and non-conducting states upon a relatively small change in the voltage from said photocell, responsive means including a relay coupled to the output circuit of said transistor, and means coupled to said relay for correctively changing the condition.

3. In an apparatus for controlling a variable condition the combination comprising a light source, a silicon p-n junction photoelectric cell optically alined with said source, means including a light vane interposed between said source and said photocell for covering and uncovering said photocell in response to changes in the condition, a transistor having a base, collector and emitter, said photocell being arranged in series with the emitter-base circuit for controlling the base current so that the transistor becomes conducting and non-conducting depending upon the presence or absence of the vane, means coupled to said collector and responsive to the condition of conduction of the transistor for correctively changing the condition, and a diode connected in parallel with said emitter-base circuit and having a temperature-current characteristic similar to the temperature-current characteristic of the emitter-base circuit of the transistor for compensating for the effect of ambient temperature changes upon said transistor.

4. In an apparatus for controlling a variable condition the combination comprising a light source, a silicon p-n junction photovoltair cell optically alined with said source, means including a light vane interposed between said source and said photocell for covering and uncovering said photocell in response to changes in the condition, a source of voltage, a transistor energized by said source of current and having a base, collector and emitter, means coupled to said collector and responsive to the condition of conduction of the transistor for correctively changing the condition, a voltage divider having a resistor and a temperature-sensing resistive element across said source of current and providing a junction, said photocell having one of its terminals connected to the base of the transistor and the other terminal connected to the junction of the voltage divider so that the transistor becomes conducting and non-conducting depending upon the presence or absence of the vane with the effect of changes in ambient temperature being compensated by said temperature-sensing resistive element.

5. In an apparatus for controlling a variable condition the combination comprising a light source, a silicon p-n photoelectric cell optically alined with said light source, a transistor having a base, collector, and emitter, one terminal of said photoelectric cell being connected to the transistor base, an output circuit coupled to said collector and having an electric relay, condition responsive means including a movable vane arranged between the light source and the photocell for controlling admission of light to the latter in response to changes in the condition, and means coupled to said relay for correctively changing the condition, the remaining terminal of the photocell being connected to the center terminal of a voltage divider having a diode in one of its legs so that the diode is effectively in parallel with the photocell and base-emitter circuit of the transistor for compensation for changes in ambient temperature of the transistor.

6. In an apparatus for controlling a variable condition the combination comprising a light source, a silicon p-n junction photoelectric cell optically alined with said source, a first transistor having input and output circuits, a second transistor having input and output circuits with its input circuit connected to the output circuit at the first transistor so that the second transistor conducts when the first becomes non-conductive, said photocell being coupled to the input circuit of said first transistor, means including a vane interposed between said source and said photocell and movable in response to the condition for controlling admission of light to said photocell, means coupled to the output circuit of said second transistor for correctively changing the condition, and a positive feedback connection between the output circuit of said second transistor and the input circuit of the first transistor for causing said transistors and the condition changing means to jump between the conducting and non-conducting conditions.

7. In an apparatus for controlling a variable condition the combination comprising a light source, a silicon p-n junction photoelectric cell optically alined with said source, means including a movable light vane interposed between said light source and said photocell for progressive changing of the light in accordance with a change in the condition, a transistor having a base, collector, and emitter, said base having a source of bais for normally biasing said transistor for conduction, said photocell being connected in the base circuit with reverse polarity so that when the photocell is exposed to the light source the bias is neutralized so as to cause the transistor to become non-conducting, responsive means including a relay coupled to the collector circuit of said transistor, and means coupled to said relay for correctively changing the condition.

8. In an apparatus for controlling a variable condition the combination comprising a light source, a photoelectric cell arranged to receive light from said source, means for progressively changing the light in accordance with a change in the condition, a transistor having an input circuit and an output circuit, a source of bias for normally biasing the input circuit of said transistor, said photoelectric cell being connected in the input circuit so that variations in light produce variations in bias, a relay coupled to the output circuit of said transistor, and positive feedback means between the output and the input circuits of the transistor so that the transistor is abruptly switched between fully conducting and non-conducting states with corresponding abrupt action of the relay upon a relatively small change in the voltage from said photocell, and means coupled to said relay and energized and deenergized thereby for correctively changing the condition.

References Cited in the file of this patent
UNITED STATES PATENTS

| | | |
|---|---|---|
| 2,264,256 | Fairchild | Nov. 25, 1941 |
| 2,547,662 | Rich et al. | Apr. 3, 1951 |
| 2,685,064 | Bergen | July 27, 1954 |
| 2,761,052 | Knudsen | Aug. 28, 1956 |
| 2,872,556 | Obermaier | Feb. 3, 1959 |
| 2,876,365 | Slusser | Mar. 3, 1959 |
| 2,907,931 | Moore | Oct. 6, 1959 |